Reissued Oct. 21, 1947

Re. 22,930

UNITED STATES PATENT OFFICE 22,930

TERTIARY BUTYL DERIVATIVE OF HEMIMELLITENE AND PROCESS FOR PREPARING SAME

Marion Scott Carpenter, Nutley, N. J., assignor to Givaudan-Delawanna, Inc., New York, N. Y., a corporation of New Jersey No Drawing. Original No. 2,144,615, dated January 24, 1939, Serial No. 55,847, December 23, 1935. Application for reissue June 24, 1947, Serial No. 756,797

4 Claims. (Cl. 260—668)

This invention relates to a tertiary butyl derivative of hemimellitene and to processes for its manufacture.

In my copending application, Serial No. 756,798, filed June 24, 1947, for the reissue of U. S. Patent 2,072,293 issued on application, Serial No. 55,848, filed December 23, 1935, I disclose and claim a new artificial musk which I have discovered and which I prepare by nitration of tert-butyl hemimellitene.

I have made the discovery that the tert-butyl hemimellitene, hitherto unknown and undescribed, may be prepared by reacting a benzene hydrocarbon containing 13 minus $x$ carbon atoms with an aliphatic compound containing $x$ carbon atoms in the presence of an acid condensing agent. The tert-butyl hemimellitene may thus be obtained:

(1) By introduction of a tert-butyl group into pseudocumene by the Friedel-Crafts reaction:

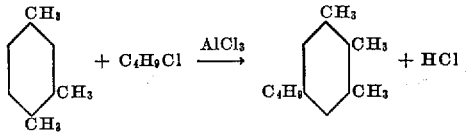

(2) By introduction of a methyl group into tert-butyl m-xylene by the method of Blanc (chlor-methylation and subsequent dechlorination):

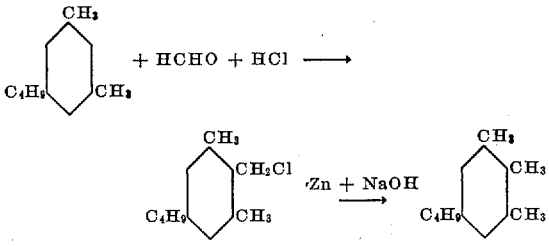

The following examples indicate various ways in which the foregoing new substances may be synthesized, it being understood that I do not limit myself to the precise conditions herein described.

*Example 1*

65 g. tert-butyl chloride is added, with constant agitation, to a suspension of 5 g. anhydrous aluminum or ferric chloride in 300 g. pseudocumene at a temperature of about 5–10° C. When the reaction has subsided, the mixture is washed with water until free of acid and inorganic salts. The excess pseudocumene is distilled off and the remaining tert-butyl hemimellitene distilled in vacuo, the fraction boiling at 92° C. under a vacuum of 3.5 mm. being collected. By working at a higher temperature the iron or aluminum chloride may be replaced by tin or titanium tetrachloride.

*Example 2*

To 1,380 g. sulfuric acid 93%, previously cooled to −10° C., there is added with efficient agitation a solution of 120 g. tert-butyl alcohol in 410 g. pseudocumene, maintaining the temperature between −10° and 0° C. The reaction mixture is poured onto ice and the oil which separates is washed free of acid and distilled as in Example 1.

*Example 3*

1750 g. 1,3-dimethyl-5-tert-butyl benzene, hereafter referred to as butyl xylene, 108 g. paraformaldehyde (or an equivalent quantity of commercial 37% formaldehyde solution) and 650 g. 31% hydrochloric acid are mixed and warmed to 50° C. Then with constant agitation there are added 1200 g. 82% sulfuric acid. After 5–6 hours agitation at 50–70° C. the formaldehyde is consumed and the reaction mixture is cooled. The acid layer is discarded, the oily layer is washed with water until free of acid and distilled, preferably in vacuo. The excess butyl xylene distills over first then, under a vacuum of 4 mm. of mercury, there is collected the desired 2,6-dimethyl-4-tert-butyl benzyl chloride boiling at 117–120° C. It soon congeals to colorless, massive rhombs melting at about 26–27° C. The specific gravity at 25° C. of the super-cooled liquid is about 1.0030–1.0040. For the dechlorination of the 2,6-dimethyl-4-tert-butyl benzyl chloride it is not necessary that it be distilled from the excess butyl xylene; the crude product obtained from the above reaction may be submitted directly to the dechlorination process, although I prefer to remove the butyl xylene first. 355 g. zinc dust are covered with 500 g. water and the suspension heated to 100° C. Then, with vigorous agitation there are introduced simultaneously the 2,6-dimethyl-4-tert-butyl benzyl chloride produced in the first step (either distilled or in the crude form containing butyl xylene) and 855 g. 18% sodium hydroxide solution. Stirring and refluxing are continued until the oily layer is free of chlorine. The oil is driven over with steam (or separated by decantation from the zinc slime) and redistilled as in Example 1. Without departing from the spirit or scope of the invention numerous modifications of the above process may be used. For example, the proportions cited above may be varied within reasonable limits, the order of introduction of the reactants may be changed or all may be added at once, the time of reaction may be shortened by elevating the temperature (working under pressure) copper powder may be added to facilitate the dechlorination, or the sodium hydroxide may be replaced by potassium hydroxide, etc.

The tert-butyl hemimellitene which is produced by any of the above methods is a colorless, crystalline material soluble in the common organic solvents, boiling at 92° C. at 3.5 mm. of mercury pressure and melting at 32–33° C.

The invention claimed is:

1. 1,2,3-trimethyl-5-tert-butyl benzene, comprising a colorless crystalline material having a boiling point of 92° C. under 3.5 mm. of mercury and a melting point of 32–33° C.

2. Process of preparing a tert-butyl derivative of hemimellitene which comprises reacting butyl xylene, formaldehyde, hydrochloric acid and sulfuric acid at 50–70° C., cooling the reaction mixture and discarding the acid layer, dechlorinating the oily portion of the reaction mixture, distilling off the oily layer, redistilling same and collecting the fraction boiling at 92° C. under 3.5 mm. of mercury.

3. Process of preparing a tert-butyl derivative of hemimellitene which comprises reacting butyl xylene, formaldehyde, hydrochloric acid and sulfuric acid at 50–70° C., cooling the reaction mixture and discarding the acid layer, treating the resulting 2,6-dimethyl-4-tert-butyl benzyl chloride boiling at 117–120° C. in a suspension of zinc dust, water and sodium hydroxide to remove chlorine, distilling off the oily layer, redistilling same and collecting the fraction boiling at 92° C. under 3.5 mm. of mercury.

4. Process of preparing a tert-butyl derivative of hemimellitene which comprises mixing butyl xylene, formaldehyde and hydrochloric acid and warming to 50° C., adding sulfuric acid to said mixture and agitating for 5–6 hours at 50–70° C., cooling the reaction mixture and discarding the acid layer, collecting the 2,6-dimethyl-4-tert-butyl benzyl chloride boiling at 117–120° C., introducing same with sodium hydroxide solution into a suspension of zinc dust and water heated to 100° C., stirring and refluxing until the oily layer is free of chlorine, distilling off the oily layer, and then redistilling and collecting the fraction boiling at 92° C., under 3.5 mm. of mercury.

MARION SCOTT CARPENTER.

REFERENCES CITED

The following references are of record in the file of this patent:

Fuson et al., J. A. C. S. 63, 2352–3 (1941).
Beil. V, 447.